US011507770B2

(12) United States Patent
Chen et al.

(10) Patent No.: US 11,507,770 B2
(45) Date of Patent: Nov. 22, 2022

(54) PRECOMPUTED SIMILARITY INDEX OF FILES IN DATA PROTECTION SYSTEMS WITH NEURAL NETWORK

(71) Applicant: EMC IP Holding Company LLC, Hopkinton, MA (US)

(72) Inventors: Qiang Chen, Hopkinton, MA (US); Jing Yu, Shanghai (CN); Pengfei Wu, Shanghai (CN); Naveen Rastogi, San Jose, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 319 days.

(21) Appl. No.: 15/929,437

(22) Filed: May 1, 2020

(65) Prior Publication Data

US 2021/0342634 A1  Nov. 4, 2021

(51) Int. Cl.
*G06K 9/62* (2022.01)
*G06N 3/08* (2006.01)
*G06F 16/33* (2019.01)

(52) U.S. Cl.
CPC ....... *G06K 9/6215* (2013.01); *G06F 16/3347* (2019.01); *G06K 9/622* (2013.01); *G06K 9/6256* (2013.01); *G06N 3/08* (2013.01)

(58) Field of Classification Search
CPC .... G06K 9/6215; G06K 9/622; G06K 9/6256; G06K 9/6271; G06F 16/3347; G06F 16/137; G06N 3/08; G06N 3/0454; G06N 5/022; G06V 10/82
See application file for complete search history.

(56) References Cited

U.S. PATENT DOCUMENTS

| | | | | |
|---|---|---|---|---|
| 10,025,950 B1* | 7/2018 | Avasarala | ............... | G06V 10/82 |
| 10,248,663 B1* | 4/2019 | Keisler | ............... | G06N 3/0454 |
| 10,258,304 B1* | 4/2019 | Kiraly | ........................ | G06T 7/12 |
| 10,438,094 B1* | 10/2019 | Ko | ........................ | G06K 9/6218 |
| 2004/0213458 A1* | 10/2004 | Kanatsu | ............... | G06V 30/414 |
| | | | | 707/E17.022 |
| 2005/0187975 A1* | 8/2005 | Yamane | ............... | G06F 16/3347 |
| | | | | 707/E17.08 |
| 2006/0143230 A1* | 6/2006 | Thorpe | ................... | G06F 16/70 |
| | | | | 707/E17.08 |
| 2009/0204605 A1* | 8/2009 | Bai | ..................... | G06F 16/3329 |
| | | | | 707/999.005 |
| 2018/0349388 A1* | 12/2018 | Skiles | ..................... | G06N 20/10 |
| 2019/0354582 A1* | 11/2019 | Schäfer | ............... | G06K 9/6297 |
| 2019/0354689 A1* | 11/2019 | Li | ............................ | G06N 3/04 |
| 2021/0374525 A1* | 12/2021 | Bremer | ............... | G06K 9/6272 |

* cited by examiner

*Primary Examiner* — John B Strege
(74) *Attorney, Agent, or Firm* — Womble Bond Dickinson (US) LLP (57) ABSTRACT

Described is a system and method that provides a data protection risk assessment for the overall functioning of a backup and recovery system. Accordingly, the system may provide a single overall risk assessment score that provide an operator with an "at-a-glance" overview of the entire system. Moreover, the system may account for changes that occur over time based on leveraging statistical methods to automatically generate assessment scores for various components (e.g. application, server, network, load, etc.). In order to determine a risk assessment score, the system may utilize a predictive model based on historical data. Accordingly, residual values for newly observed data may be determined using the predictive model and the system may identify potentially anomalous or high risk indicators.

20 Claims, 9 Drawing Sheets

PRECOMPUTED SIMILARITY INDEX OF FILES IN DATA PROTECTION SYSTEMS WITH NEURAL NETWORK

TECHNICAL FIELD

Embodiments of the present disclosure generally relate to data storage systems. More particularly, embodiments of the disclosure relate to a system that generates a precomputed similarity index to enable fuzzy search of similar documents within a backup system.

BACKGROUND

Data has been recognized as one of the most important asset for almost every business today. It is crucial for business owners to properly protect the data by creating regular and frequent backups. However, excessive and unregulated collection of personal and private data has also drawn much public attention such that regulations are tightening the constraints on the collection and storage of data. For instance, the General Data Protection Regulation (GDPR), which went into effect in 2018, puts many restrictions on companies that store user data.

Figure 1:
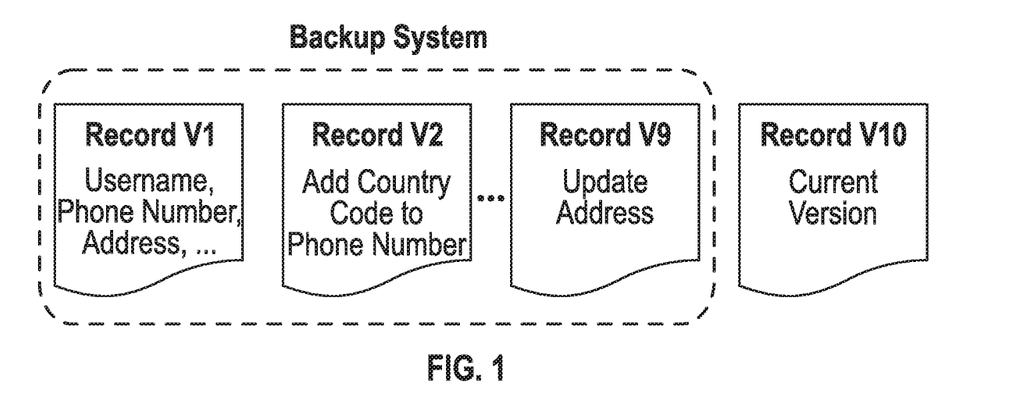
FIG. 1 is a block diagram illustrating a file record having multiple stored versions.

For example, the GDPR provides a right of erasure, under which a data subject has the right to request erasure of personal data related to them. Since companies must put in place appropriate technical and organizational measures to implement the data protection principles under the GDPR, these companies must have a system that enables finding data requested to be erased. FIG. 1 illustrates data record of a user, which helps illuminate the compliance problem.

In the example of FIG. 1, a social-network company has stored the personal information of each user. Because they have a regular backup plan, the record of each user's information has multiple replicates in the backup system. And because each user may change the information over time, e.g. change phone numbers (Record V2), upload address (Record V9), etc., the replicates may not be the same. In this case, upon erasure request, the company needs to use the current record V10 as the query file, to search over the backup system to find all previous versions of the file, including all copies that contain some minor differences. However, since conventional backup searching system use exact match by hash index, it may only be able to find some recent records that are identical to current version, but may miss out older records (e.g., before V9). If the user decides to remove all data stored by the company, which is granted by GDPR, and if some past records do not have proper metadata to link to the user, then the current system would fail to find all of the records, and it leads to violation of the government regulation.

Accordingly, a need exists in the art to enable searching of database systems for all files relating to a query file, even if the related files are similar, but not identical to the query file.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosure will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

Reference in the specification to "some embodiments," "one embodiment" or "an embodiment" means that a particular feature, structure, or characteristic described in conjunction with the embodiment can be included in at least one embodiment of the disclosure. The appearances of the phrase "embodiment" in various places in the specification do not necessarily all refer to the same embodiment.

According to some embodiments, described is a system (and method) that provides a similarity index at file level, which can overcome the limitations of the hash index and be used for content-based fuzzy file search. The files in the backup system are first chunked and passed to the indexing function in a conventional manner. Additionally, similarity vectors are generated for each of the chunks. The sequence of similarity vectors for data chunks of a file is viewed as a long image, each chunk similarity vector viewed as a vector of pixels. The sequence of similarity vectors is passed to a pre-trained neural network and converted to a single feature vector (the similarity index for file) as a representation of the original data file.

To be sure, the disclosed system and method need not replace the standard indexing, but may be used to supplement it. In current backup systems, exact file search can be very efficient with the underlying hash indices for all data chunks and the Merkle trees from chunk to file system. A key property of hash function used in the backup system is that a small change in the input leads to significantly different output, which helps to distribute the data well across all available storages. It is also very efficient for searching exact match, and may be preserved for those reasons. On the other hand, in the case when we need fuzzy content search by partial matching, the hash index is no longer a proper choice because of this property. Therefore, the disclosed similarity index supplements the standard indexing to enable fuzzy search when needed for compliance and other purposes when broader than exact matches are needed.

In disclosed embodiments, as a first step a similarity index for data chunk is implemented, which generates a similarity index for the data chunks. The chunk-level similarity index is a collection of numerical vectors (also referred to as feature vector), each being a short representation of the key features of the corresponding raw chunk content. The similarity index can be used to quantitatively measure the similarity of content between chunks. Namely, data chunks that have similar content would get similar feature vectors (similarity indices), and vice versa. The new chunk index, having the property of similarity representation, can be used for fuzzy chunk search. Any new chunk can be fed to the index function to get a feature vector, and the vector can be used to search inside a precomputed (similarity) index database to find the closest vectors, and then get references to the most similar data chunks. From the user point of view, the similarity index works like the hash index, except that it does fuzzy search over potentially many matches, whereas the hash index is limited to exact match.

In disclosed embodiments, the next level is to generate a file-level similarity index. Like in similarity index for data chunks, the file-level similarity index is also computed by a pre-trained neural network, but it operates on a sequence of chunk similarity vectors, as opposed to raw bytes of the chunks. Also, similar to the chunk-level similarity index, the file-level index is an extension over the existing hash index framework, so it is compatible with and may supplement the current system but with additional features. The file-level similarity index is built upon the chunk-level index. Therefore, for full understanding, a brief explanation of the chunk-level index is provided first.

To fully understand the usefulness and advantages of a chunk-level similarity index, the following problem is considered. Turning back to the example of FIG. 1, in certain cases part of the user's data is copied to another aggregation data file (not shown), and that file should be found and the data removed as well according to the regulation. This would require to not only perform fuzzy search, in which we search by the content of the whole file, but also partial data matching over files from a given query file. In this case, it is be better to just use key data chunks to do the fuzzy search, which can address the partial fuzzy matching problem.

In disclosed embodiments, a similarity index for chunks in data protection systems is generated, and this index is used to enable advanced functionalities such as fuzzy content search, which is not possible with the current hash based index. The similarity index is a fixed-length numerical vector that is much shorter than the original content of the chunk. The index can be treated as a short representation of the original data chunk, and can be used as a surrogate to compare the similarity between the original data chunks. In other words, qualitatively speaking, two similar chunks should have similar indices, and dissimilar chunks should have indices that are far away from each other (as calculated by some predefined distance measure, like the most commonly used Euclidean distance).

Figure 2:
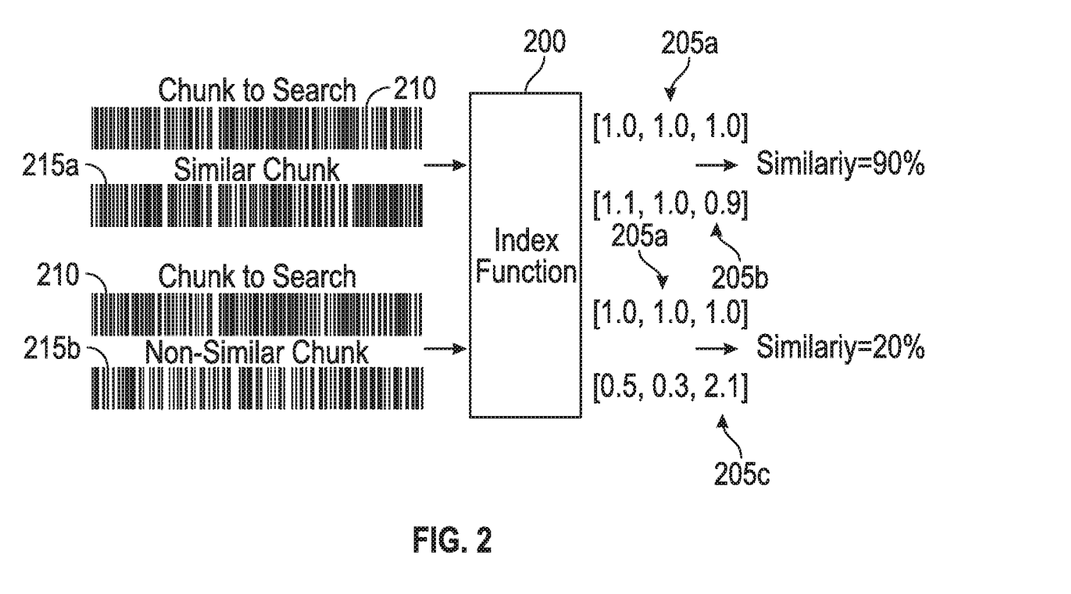
FIG. 2 illustrates similarity index and the corresponding index function according to an embodiment.

The similarity index and the corresponding index function can be illustrated as the graph shown in FIG. 2. The index function 200, which accepts a data chunk as input, computes a numeric vector 205a-205c, also referred to as a feature vector as it contains summarized "features" from the raw chunk. For a given query chunk 210, noted as "Chunk to search" in the figure, the index function generates a query vector, e.g., 205a. Then for other chunks, e.g., 215a, 215b, if the chunk is similar to the query chunk, the feature vector should be equally close to the query vector. See, e.g. vectors 205a and 205b. A non-similar chunk on the other hand, should get a feature vector that is very different from the query string. See, e.g., vectors 205a and 205c.

The closeness of feature vectors can be quantified with a distance function. Two commonly used distance functions are L2 norm distance (Euclidean distance) and cosine distance. The Euclidean distance provides a measure of straight-line distance between two points in Euclidean space, while the cosine distance indicates the similarity of orientation and not magnitude of the vectors. The similarity or closeness of the raw chunks can be calculated over the raw bytes sequence, with similarity metric like Jaccard index (a measure of similarity for the two sets of data, calculated by (the number in both sets)/(the number in either set)*100) or Jaccard distance (a measure of how dissimilar two sets are, which is a complement of the Jaccard index). For a successful similarity index function, the distance of the raw data chunks should be equal or close to a predefined error range with the distance of the feature vectors computed from the index function.

Figure 3:
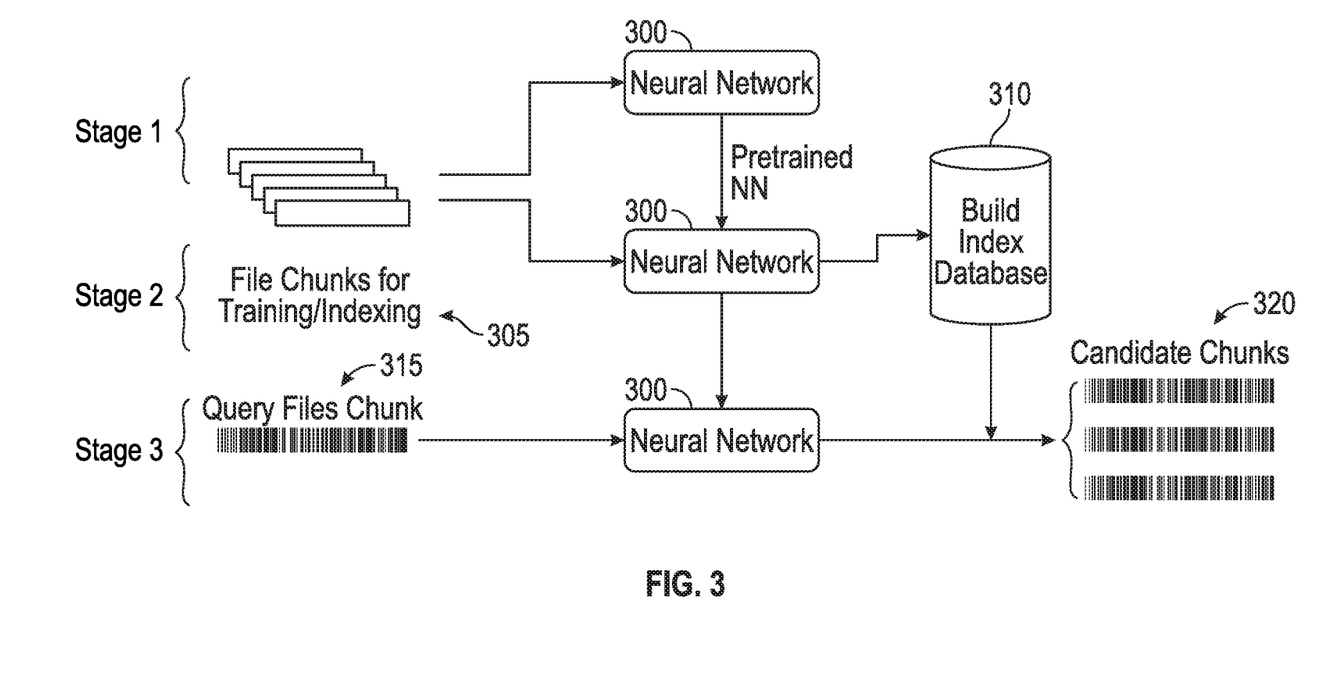
FIG. 3 is an overall flow chart of a similarity index for data chunks according to an embodiment.

FIG. 3 is an overall flow chart of a similarity index for data chunks according to an embodiment. In the illustrated example, a neural network is used to convert a data chunk into a fixed length vector (sometimes also referred to as a feature vector, or an embedding vector), which serves as a similarity index. Contrary to hash-based index, the similarity index can be used to measure the similarity between the original data chunks. An initial process is to train the neural network to generate the vectors for the similarity index. The second step is to build the index database, and third step is actual use during query operation. The training part can be performed beforehand by a supplier of the system to a user company. Alternatively, or additionally, the training may be performed or augmented by the user company in order to provide improved results tailored to the specific data backed-up by the user company.

FIG. 3 illustrates the three stages of the process. Stage 1 is training the neural network 300. The neural network 300 is trained from a large corpus of data chunks 305, also commonly referred to as the training data. After this step, a pre-trained neural network is ready for computing the similarity index.

Stage 2 is building the index database. Data chunks for indexing are fed to the neural network, and the output indices are saved to an index database 310, forming a collection of numerical vectors. If the training was done by the user company, then the data chunks to be indexed may be the same data chunks 305 used for training. Conversely, if the training was done prior to delivery of the system, the data chunks for indexing may be different from the data chunks 305 used for training. For simplicity, FIG. 3 illustrates the situation wherein the data chunks to be indexed are the same as those used for training.

An optional Stage 3 is the query stage. This stage is optional for this discussion, since it is not used when the query is for a file. Nevertheless, it is described herein for completeness. When implemented, the query data chunk 315 is fed to the neural network 300 and a similarity vector is generated for the input query chunk. The output similarity vector is used to search the index database 310 for most similar vectors, and then return the references to those chunks as candidate similar chunks 320.

It should be appreciated that the three stages are performed at different times in sequence. However, once the similarity index database is completed, a new query may be submitted at any time. Of course, as new data is stored in the backup system, the index database 310 needs to be updated, just as a hush index is updated.

Figure 4:
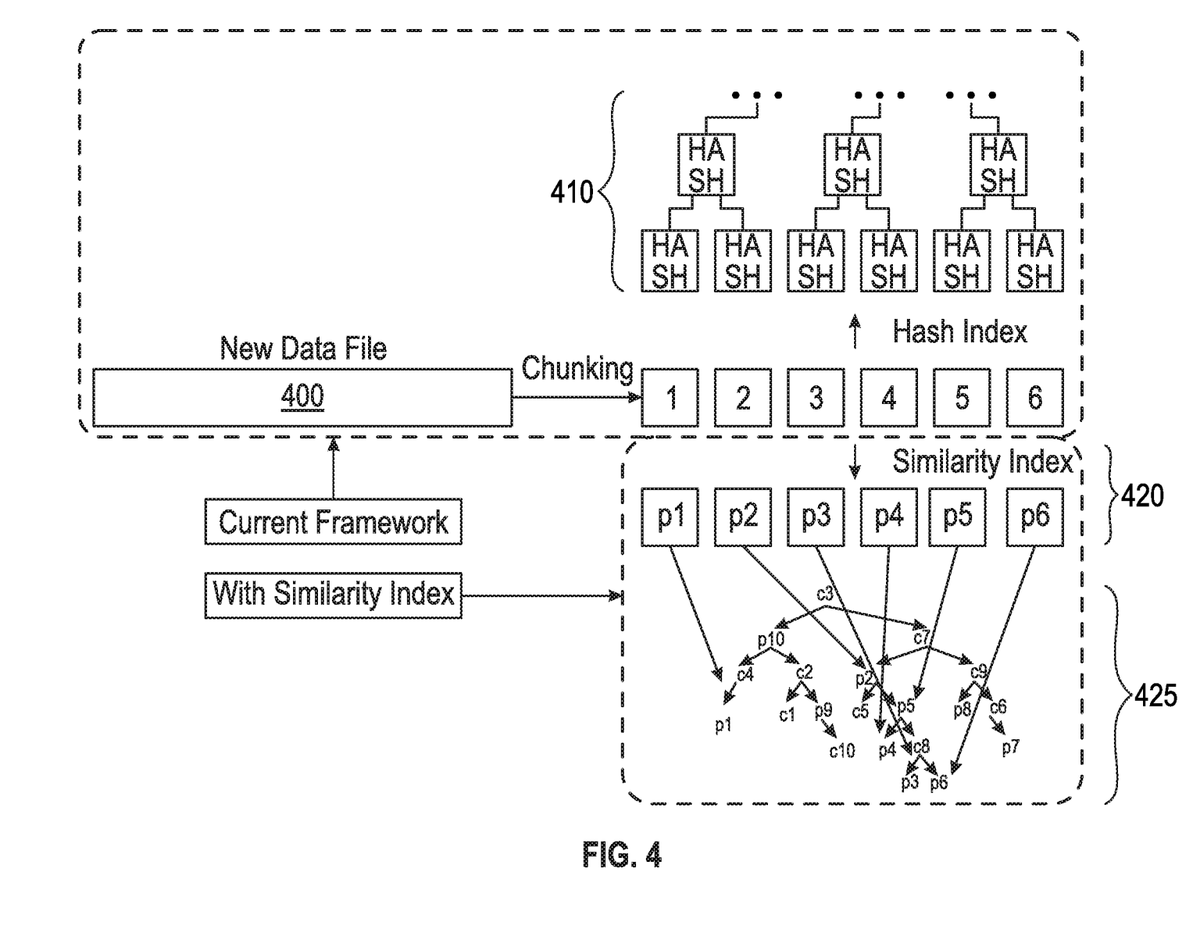
FIG. 4 is an example of the handling of a new data file by both the conventional hash indexing and the new similarity indexing according to an embodiment.

In that respect, as indicated previously, the similarity index may co-exist with the hash index, and may actually act as an extension of the hash index framework. FIG. 4 illustrates an example of the handling of a new data file by both the conventional hash indexing and the new similarity indexing. Both methods can operate in parallel. When a new data file 400 is received for backup, the file is cut into chunks, e.g., 1-6, whether of same or different lengths. On the conventional side (upper part of the diagram), a hash value is calculated for each of the chunks, and then a Merkle tree is constructed of the hash values. Additionally, according to an embodiment (bottom part of the diagram), in 420 a similarity vector p1-p6 is generated by a trained neural network of reach of the chunks. Then, at 425 a similarity index database is constructed using the similarity vectors. The similarity index database can be used for fuzzy search of chunks at a future query stage using, e.g., a KD-tree for querying the index database, as will be explained below.

To generate the similarity vectors, the neural network needs to be trained so that similarity of vectors would correspond to similarity of chunks. In embodiments, the neural network is a function that projects input (data chunk) of any length into a fixed-length feature vector. The neural network structure is designed in such a way that similar inputs get close outputs, and dissimilar inputs get distinct outputs. Neural networks that achieve such goal in general are also referred to as Siamese networks or twin neural network.

Figure 5:
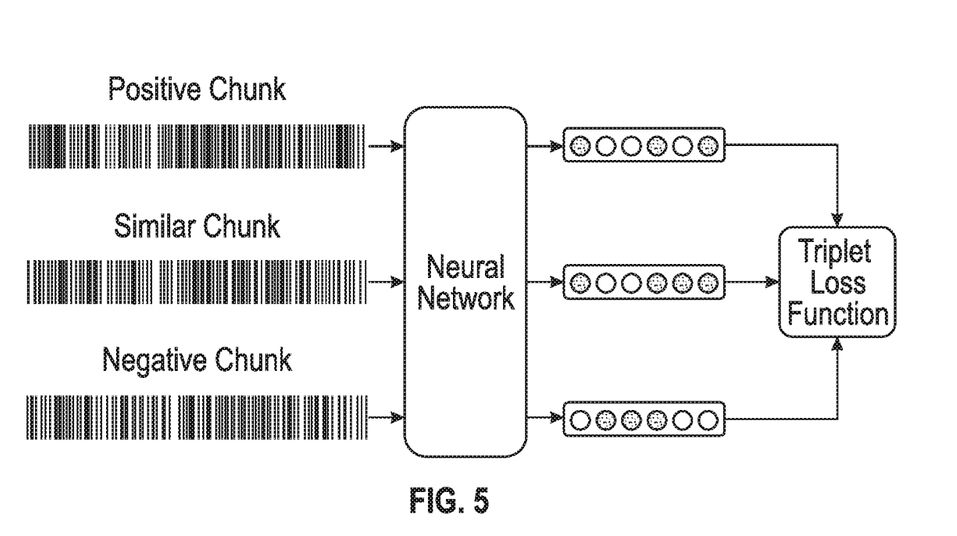
FIG. 5 is a diagram illustrating an example design of twin neural network combined with triplet loss function to train the feature extractor network, according to an embodiment.

FIG. 5 illustrates an example design of twin neural network combined with triplet loss function to train the feature extractor network (the function to generate the similarity index), according to an embodiment. During training time, three inputs are fed into the same neural network, which generates three output vectors and passed into a triplet loss function. In the training process, an optimizer continuously adapts the internal weights of the neural network to minimize the triplet loss over the training data.

The data set for "training" the neural network model can be constructed from a big corpus of given data files. The files are chunked in a fixed-length or variable-length, depending on the actual use case. For the example network as shown in FIG. 5, the training set can be constructed into groups of three data chunks, in which the positive and negative chunks are randomly selected from the training chunk set, and the "similar chunk" is generated by randomly changing a small part of the positive chunk. To be more precise, the similar chunk is created at training time from the given positive chunk, by randomly changing, adding or removing small part of the original positive chunk. Thus, the vectors generated for the positive and similar chunks should be similar, as exemplified by the solid and clear circles, while the vectors for the negative chunk should be different from the other two vectors. The distance between two generated vectors should be similar to the distance measured for the raw data of the actual underlying chunks.

The "triplet loss", which enforces the neural network to learn to ultimately become a similarity index function, is defined as the following function:

$$L(P,S,N)=\max(\text{dist}(f(P),f(S))-\text{dist}(f(P),f(N))+\alpha,0)$$

Where P is the positive chunk, S is the similar chunk, N is the negative chunk, $f$ is the neural network (which is nothing but a function), dist is the distance function to measure the similarity between the generated vectors, $\alpha$ is a predefined margin between the positive and negative pairs. By minimizing the triplet loss, the neural network learns to get lower distance between P and S, and get higher distance between P and N. And this property is exactly the desired property for the similarity index.

The feature (or similarity) vectors are used to search similar data chunks instead of searching the whole file. This allows fuzzy matching over the key segments of file. It is particularly useful in cases where the file has been trimmed and/or appended with some other content, both of which would lead to significant change of the feature vector of the whole file.

Figure 6:
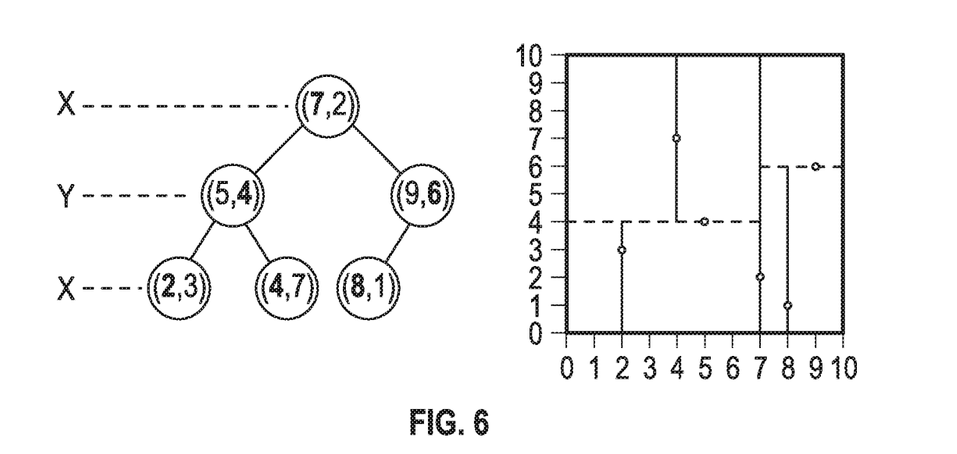
FIG. 6 is an example of using KD-tree data structure for fast nearest-neighbor search.

For efficient querying, the similarity index database can be stored in a data structure or software that is optimized for nearest-neighbor search. One example is the KD-tree data structure, which by average can reduce the original O(n) query time complexity to O(log n). It achieves this speedup by segmenting the index database into a tree. FIG. 6 shows a simplified version of using KD-tree for querying, where the dimension of the feature vector is only two. Simply speaking, when searching for nearest-neighbor, we start from the root node, move down the tree recursively until reaching a node, and then unwind the recursion of the tree to find nearer points. Notably, the KD-tree algorithm presented here is only one example, and there are other algorithms that achieve search efficiency which may be used as well.

In the embodiments disclosed, a similarity index database is provided, which may operate alongside the current hash index. Also disclosed is a method to generate the similarity index by neural network. The similarity index is a fixed-length feature vector, which is a short representation of the raw byte sequence. The function (neural network) to generate this index is trained from a large corpus of data chunks, in such a way that the closeness (similarity) between the input byte sequences is (ideally) equal to the closeness of the output vectors. With the similarity index database, any given query content of a data chunk can be fuzzily searched by the feature vector of the raw query content. Each feature vector is much shorter than the data chunk from which it originates, but it may be used to approximate the similarities of data chunks.

The function to generate the similarity index is a neural network (e.g. RNN). The neural network is designed so that an input byte sequence of any length can be projected into a fixed-length vector. It is trained in a way that similar data chunks get similar vectors, and vice versa.

The method is now expanded to generate a similarity index for files. The similarity index at file level can be used for content-based fuzzy file search. As explained above, the files in the backup system are chunked, similarity vector is generated for each chunk, and the vectors are passed to the indexing function to generate the similarity index database for the chunks. The sequence of similarity index for data chunks of a file are viewed as a long image, wherein each index viewed as a vector of pixels. The image is passed to a pre-trained neural network, and then converted into a single feature vector (the similarity index for file) as a representation of the original data file. Since the feature vector for the file is constructed out of the similarity vectors of the chunks making up the file, similar files will inherently have similar feature vectors.

Figure 7:
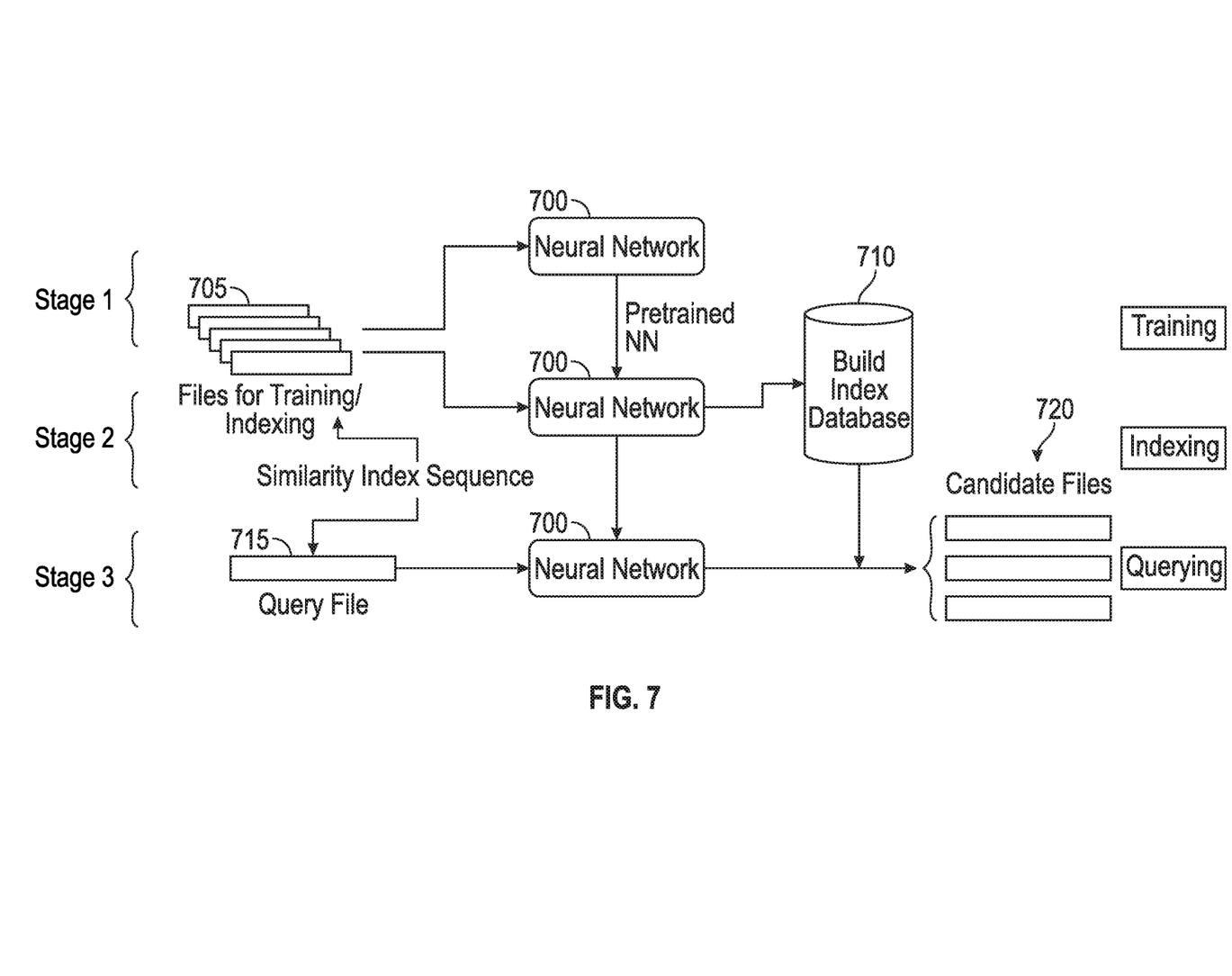
FIG. 7 illustrates the overall workflow of the file-level similarity index according to an embodiment.

FIG. 7 illustrates the overall workflow of the file-level similarity index. The workflow of FIG. 7 is similar to chunk-level similarity index of FIG. 3, but with some key differences. Notably, the input to the neural network is a sequence of chunk similarity vectors, as opposed to raw bytes of data chunk. As with the work flow of FIG. 3, on a high level, the overall process of the embodiment illustrated in FIG. 7 consists of three major steps.

In an embodiment the first step is training the neural network 700. The neural network is trained from a large corpus of data files 705, also referred to as the training data. After this step, we have a pre-trained neural network for computing the similarity index to construct the similarity index database 710.

As noted with respect to the embodiment of FIG. 3, the training step can be completed by the vendor of the backup system, e.g., Dell EMC, or by the user of the system. The model can train on large corpus of data from various data sources, to learn from the common patterns of structures present in the sequence of data chunks. The pre-trained neural network model can ship as part of the software of the backup system. If desired, the user may augment the training using user specific training data.

Stage 2 is the indexing stage. The client/user feeds all the data files for indexing to the neural network (completed automatically by the software), which saves the output indices (a collection of numerical vectors) to an index database 710. If the training was done by the user, the data files for indexing may be the same data files used for the training. Otherwise, the data files for indexing are the client/user specific data files.

Stage 3 is the query stage and is available continuously after generating the first index database 710. The user may feed the query file 715 to the neural network and the neural network 700 generates a vector for the input file. The generated vector is then used to search the index database 710 for most similar vectors, and then return the references to those files as candidate similar files 720.

Figure 8:
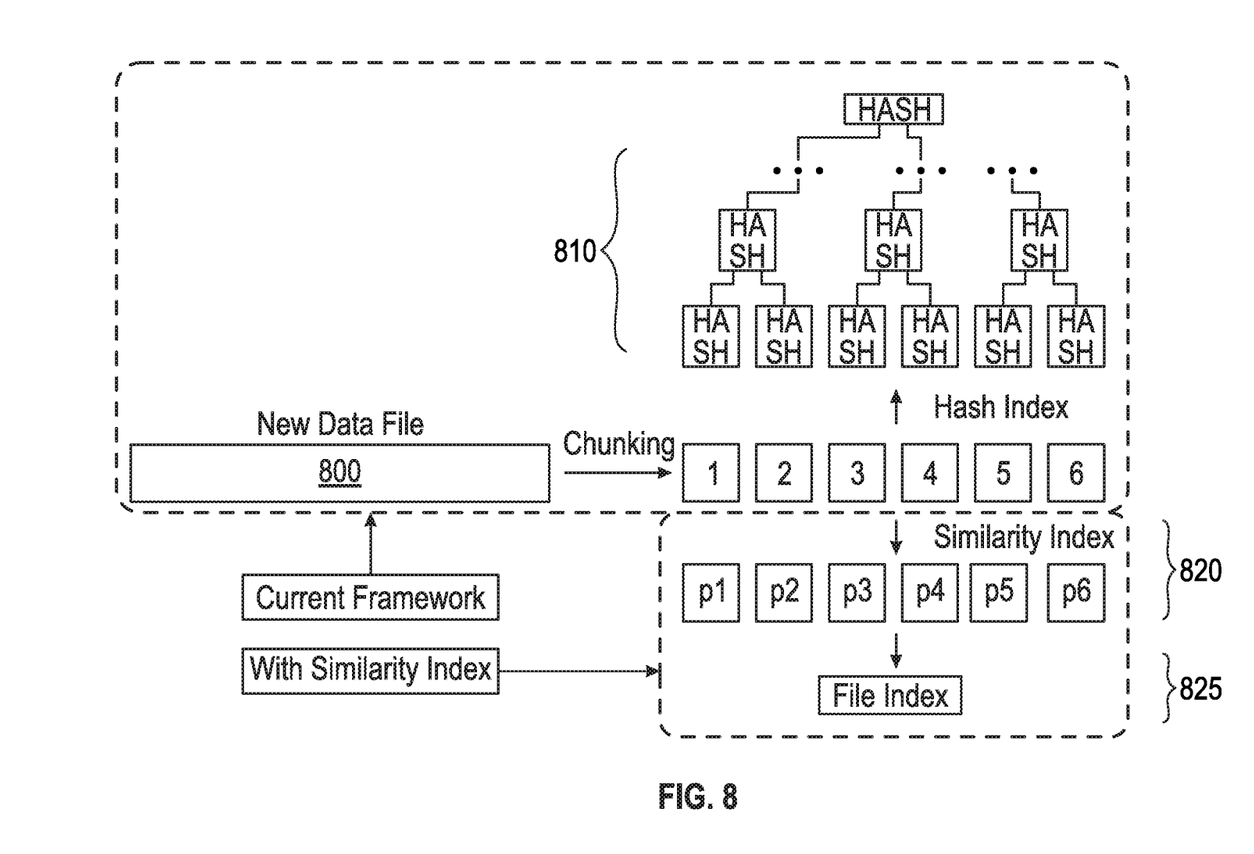
FIG. 8 illustrates indexing workflow for generating conventional hash Merkle tree and for generating the similarity index functionality according to an embodiment.

Similar to the chunk-level similarity index, the file-level index is an extension over the existing hash index framework, so it is compatible with the current system but with additional features. The file-level similarity index may provide an enhancement to the chunk-level index. FIG. 8 illustrates indexing workflow for generating conventional hash Merkle tree (upper part of the diagram) and for generating the similarity index functionality according to an embodiment (bottom part of the diagram). Notably, unlike the hash index, there is no hierarchical structure for building the file-level similarity index. The file index is directly computed from the sequence of indices of the chunks making up the file.

As illustrated in FIG. 8, a new data file 800 is chunked into fixed or variable size chunks 1-6. The upper part of the diagram illustrates the building of the hash index in a known manner. In the lower part, in 820 the similarity vector p1-p6 of each of the chunks is obtained and in 825 the neural network operates to convert the sequence of chunk similarity indices in arbitrary size to a fixed-length numerical vector and generate the file-level index.

For example, assume each of the six chunk index p1-p6 is 10-dimensional feature vector. The system then assembles the chunk feature vectors into an image vector of six by ten. That is, the result is a two-dimensional array of numbers, one dimension is vector size, here ten, the other dimension is sequence length, here six.

To achieve this, the sequence of chunk similarity indices is viewed as a long image. This is a straightforward (though may be not intuitive) process. The sequence of chunk-level indices is just a sequence of vectors, or two-dimensional array of numbers (one dimension is vector size, the other dimension is sequence length). Whereas a grayscale image is also a two-dimensional array of numbers. Therefore, we can use methods for extracting feature vectors from images to do the same for index sequence as well.

However, there is one key difference between regular image and index sequence: the former is usually of similar size in both dimensions, while for the later the sequence length is usually much longer than the vector size. In such cases, we can use a spatial pyramid pooling structure incorporated in the neural network to convert arbitrarily sized sequence into a fixed-length vector, as shown in FIG. 9.

Figure 9:
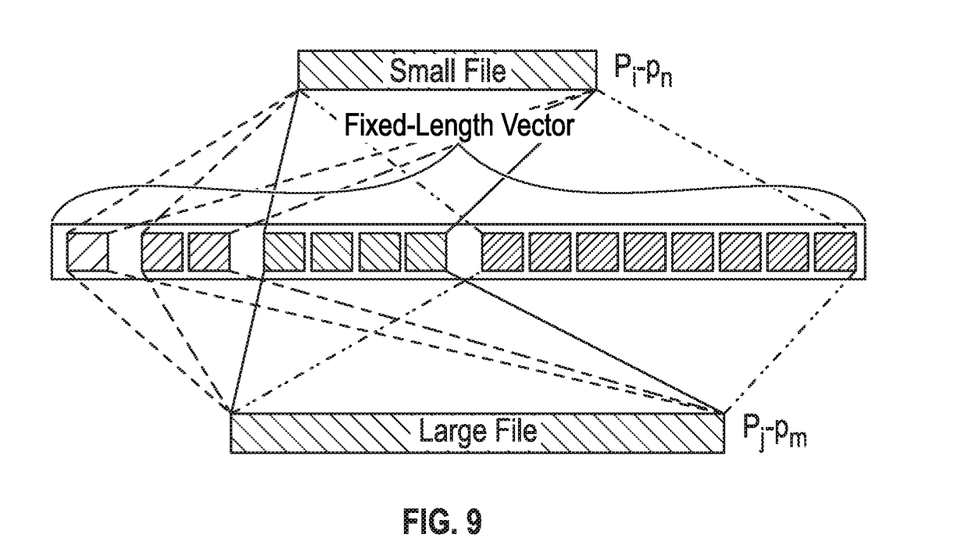
FIG. 9 illustrates an example of a spatial pyramid pooling structure incorporated in the neural network to convert arbitrarily sized sequence into a fixed-length vector according to an embodiment.

FIG. 9 illustrates the chunk indices of a small file $p_i$-$p_n$ and the chunk indices of a large file $p_j$-$p_m$ are converted into a fixed-length vector. Basically, we split the given sequence into some predefined number of bins (e.g. 1, 2, 4, 8 . . . as illustrated in FIG. 9), compute the max pooling within each bin, and then concatenate all the bins together into one fixed-length vector. After this process, the resulting vector size is the sum of the predefined number of bins, regardless of the input size.

Since the assembled indices are considered as an image vector, we can partition the input image vector into a set of non-overlapping sub-regions and, for each such sub-region, output a representative value, e.g., the maximum value. Each representative value of a sub-region is input into one of the bins. In the example illustrated in FIG. 9, the first bin is generated from the chunk vectors for the entire file, i.e., the entire image. The second and third bins are generated by cutting the sequence of vectors in half and obtaining the representative value for each half. The fourth to seventh bins are generated by cutting the sequence of vectors into fourths and selecting the representative value for each fourth, and so on. In this manner, regardless of the size of the original file, the neural network can always generate a fixed size vector for the file having its length determined by the number of bins.

The neural network structure is designed in such a way that similar inputs get close outputs, and dissimilar inputs get distinct outputs. We again refer to twin neural networks with the example illustrated in FIG. 10. During the training stage, three inputs are fed into the same neural network, which generates three output vectors and passed into a triplet loss function. In the training process, an optimizer continuously adapts the internal weights of the neural network to minimize the triplet loss over the training data. Generally, the internal weights of the neural network are changed so as to minimize the distance between the output vectors of the positive file and the similar file, and maximize the distance of the vectors for the positive file and the negative file.

Figure 10:
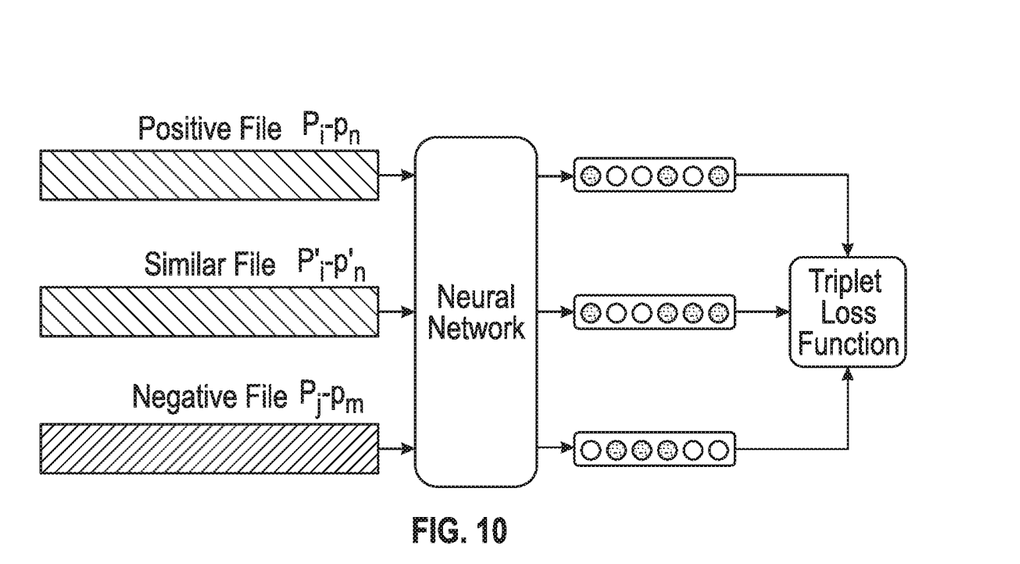
FIG. 10 illustrates an example of twin neural networks for training of file level similarity vectors according to an embodiment.

The data set for "training" the neural network model can be constructed from a big corpus of given data files, which is similar to the process of chunk-level similarity index. Again, here the key difference compared to the chunk-level index is that the input is sequence of indices instead of raw bytes. The files are chunked in a fixed-length or variable-length way, depending on the actual use case. For the example network as shown in FIG. 10, the training set can be constructed as groups of 3 index sequences, in which the positive and negative sequences are randomly selected from the training file set, and the "similar file" is generated by randomly change a small part of the positive file. To be more precise, the similar file is created at training time from the given positive file, by randomly changing, adding or removing a small part of the original file index. This is schematically indicated in FIG. 10 by the positive file being constructed out of indices $p_i$-$p_n$, the similar file is a modified positive file indicated as n, and the negative file is constructed out of different indices from a different file, indicated as $p_j$-$p_m$. The "training" is performed by modifying the internal weights of the neural network so as to minimize the distance between the vector of the positive file and the vector of the similar file, and maximizing the distance between the vector of the positive file and the vector of the negative file.

An example of a function used for training is the "triplet loss" function, which enforces the neural network to learn to ultimately become a similarity index function, and is defined as the following function:

$$L(P,S,N)=\max(\text{dist}(f(P),f(S))-\text{dist}(f(P),f(N))+\alpha,0)$$

where P is the positive chunk, S is the similar chunk, N is the negative chunk, $f$ is the neural network, dist is the distance function to measure the similarity between the generated vectors, $\alpha$ is a predefined margin between the positive and negative pairs. By minimizing the triplet loss, the neural network learns to get lower distance between P and S, and get higher distance between P and N. And this property is exactly the desired property for the similarity index.

Referring back to the process shown in FIG. 7, with the pre-trained neural network (also referred to as a "model"), we can feed all the files in the system into the model to get the similarity indices of all files and generate an index database 710. And then at query time, we compute the similarity index for the given query file, and use the resulting index to search over the database 710 of precomputed indices to find files that have similar content. For efficient querying, the index database can be stored in a data structure or software that is optimized for nearest-neighbor search. As before, one example is the KD-tree data structure discussed with respect to the chunk similarity index.

Figure 11:
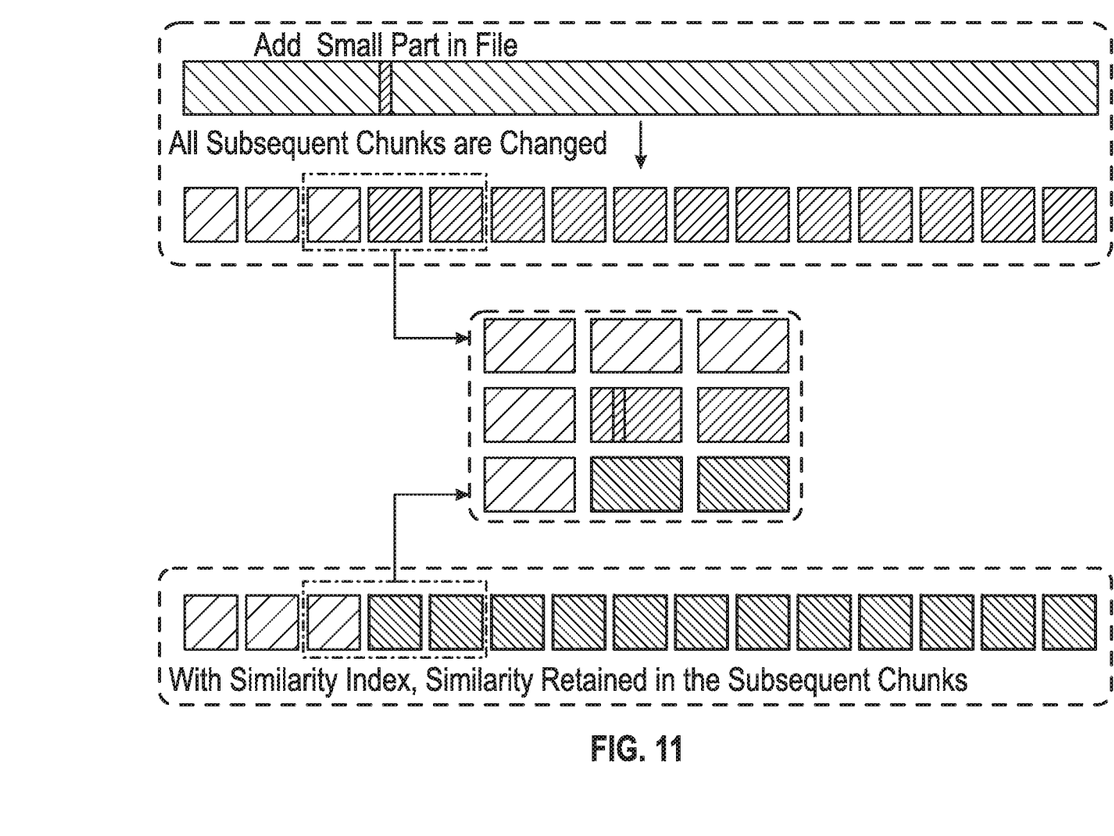
FIG. 11 illustrates the file-level similarity index insensitivity to the chunking method used for hash indexing and deduplication of backed-up files.

Another key property of the currently disclosed embodiments is that with the help of the chunk-level similarity index, the file-level similarity index offers insensitivity to the chunking method. An example to clarify this point is introduced in FIG. 11, wherein a small part of new content is inserted into a file. Because of this, when using the hash index, the hash values of all subsequent chunks are changed significantly (when using fixed length chunking methodology). In this case, it's practically impossible to match this changed file just by hash index. On the other hand, if we use similarity index for data chunks, even though the contents of all chunks are changed, the index is still similar because most contents are similar. And because the chunk indices are similar, the file-level similarity index computed from them is also similar.

Hence, the disclosed embodiments provide a similarity index at the file level, which enables fuzzy content searching. The similarity index is a fixed-length feature vector extracted from the sequence of chunk indices of the given file. The sequence is treated as a long image and convolutional neural network is applied to extract the key data patterns as short representation of the raw content. Notably, the file level index is robust to content change, even in a fixed-size chunking case. The neural network can be pre-trained by the vendor of backup system, or optionally retrained by the customer data for better performance.

Figure 12:
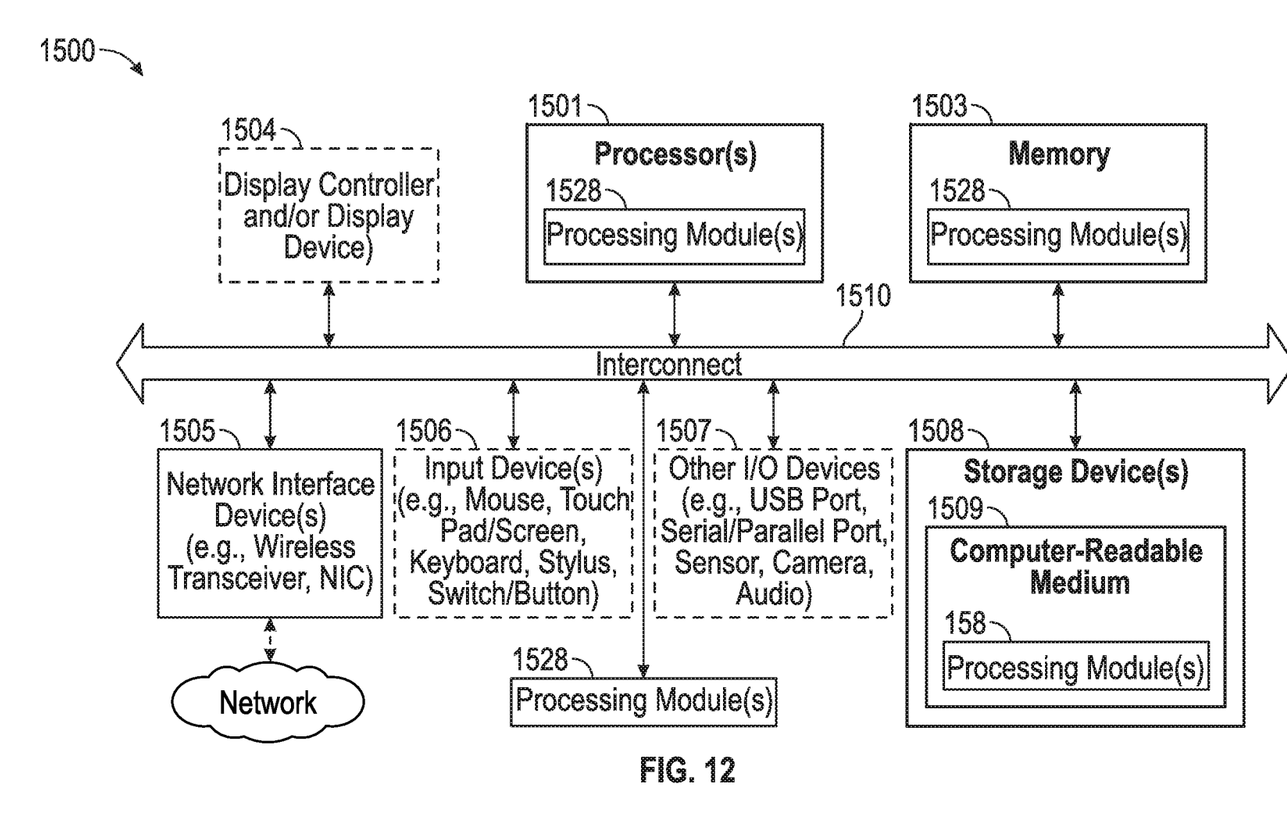
FIG. 12 is a block diagram illustrating an example computing system that may be used in conjunction with one or more embodiments of the disclosure.

FIG. 12 is a block diagram illustrating an example computing system that may be used in conjunction with one or more embodiments of the disclosure.

For example, system 1500 may represent any of data processing systems described above performing any of the processes or methods described above, such as, for example, one or more components of the backup system and implementing the similarity index databases for chunks and for files. System 1500 can include many different components. In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501 may be configured to execute instructions for performing the methods, processes, operations, functions, etc. as discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a Wi-Fi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include various electronic displays (e.g., a monitor having a screen, a small LCD touch-screen or any other electrical device that is operable to display information), audio output (such as speakers). For example, vehicle 101 may include an internal electronic display. In this regard, internal electronic display may be located within a cabin of vehicle. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

Storage device 1508 may include computer-readable storage medium 1509 (or machine-readable storage medium, computer-accessible medium, etc.) on which is stored one or more sets of instructions or software (e.g. processing modules 1528) embodying any one or more of the methods, processes, operations, functions, etc. as described herein. In addition, the computer-readable storage medium 1509 may also include removable or portable media (e.g. magnetic disk storage media, optical storage media, USB media, CD-ROM, flash memory devices, etc.).

Processing modules 1528 (or component/unit/logic) may represent any of the components of configuration 100 (e.g. risk management manager 106, deduplication logic 107, etc.). Processing modules 1528 may also reside, completely or at least partially, within memory 1503 and/or within processor 1501 during execution thereof by system 1500, memory 1503, and processor 150, which may also constitute a computer-readable storage medium. In addition, processing modules 1528 can be implemented as firmware or functional circuitry within hardware devices. Further, processing modules 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

The processes or methods depicted in the preceding figures may be performed by processing logic that comprises hardware (e.g. circuitry, dedicated logic, etc.), firmware, software (e.g., embodied on a non-transitory computer-readable storage media), or a combination of both. Although the processes or methods are described above in terms of some sequential operations, it should be appreciated that some of the operations described may be performed in a different order. Moreover, some operations may be performed in parallel rather than sequentially.

The term "approximately" or "substantially" may be used herein and may be interpreted as "as nearly as practicable," "within technical limitations," and the like. In addition, the use of the term "or" indicates an inclusive "or" (e.g. "and/or") unless otherwise specified.

In the foregoing specification, example embodiments of the disclosure have been described. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method, comprising:
    for each file from a plurality of files:
        chunking the file into a plurality of chunks;
        loading the plurality of chunks into a neural network and operating the neural network to generate a plurality of feature vectors, one feature vector for each of the plurality of chunks, wherein the neural network is pre-trained to generate similar feature vector for similar chunks and dissimilar vector for dissimilar chunks;
        assembling the plurality of feature vectors into a single vector; and
        loading the single vector into the neural network to generate a file feature vector,
    wherein the neural network is pre-trained to generate similar file feature vector for similar assembled feature vectors and dissimilar file feature vector for dissimilar assembled feature vectors; and
    storing the file feature vectors of the plurality of files into a file feature vector database.

2. The method of claim 1, further comprising converting each of the single vectors into a fixed-length single vector prior to loading the fixed-length single vector into the neural network.

3. The method of claim 2, wherein the converting is performed by defining a plurality of bins, pooling the single vector into the plurality of bins, and concatenating the plurality of bins to generate the fixed-length single vector.

4. The method of claim 1, further comprising, upon receiving a query file, performing the operations:
    chunking the query file into a plurality of chunks;
    loading the plurality of chunks into the neural network and operating the neural network to generate a plurality of feature vectors, one feature vector for each of the plurality of chunks;
    concatenating the plurality of feature vectors into a query vector; and
    loading the query vector into the neural network and operating the neural network to search the file feature vector database for all file feature vectors within a specified distance from the query vector.

5. The method of claim 4, wherein a distance between the query vector and a file feature vector equals a distance between the query file and a file corresponding to the file feature vector to within a predefined error.

6. The method of claim 1, further comprising pre-training the neural network by the process comprising:
    obtaining a plurality of training files;
    for each training file from a plurality of training files performing:
        chunking the training file into a plurality of chunks;
        loading the plurality of chunks into a neural network and operating the neural network to generate a plurality of feature vectors, one feature vector for each of the plurality of chunks, wherein the neural network is pre-trained to generate similar feature vector for similar chunks and dissimilar vector for dissimilar chunks;
assembling the plurality of feature vectors into a training vector;
generating a modified vector by modifying the training vector;
selecting a negative vector determined to be dissimilar to the training vector;
loading the training vector, the modified vector and the negative vector into the neural network to generate a file feature vector for each of the training vector, the modified vector and the negative vector; and
adapting internal weights of the neural network to minimize a distance for the file feature vectors for the training vector and the modified vector, and maximize the distance for the file feature vectors for the training vector and the negative vector.

7. A non-transitory computer-readable medium storing instructions which, when executed by one or more processors of a computing device, cause the computing device to perform operations comprising:
for each file from a plurality of files:
chunking the file into a plurality of chunks;
loading the plurality of chunks into a neural network and operating the neural network to generate a plurality of feature vectors, one feature vector for each of the plurality of chunks, wherein the neural network is pre-trained to generate similar feature vector for similar chunks and dissimilar vector for dissimilar chunks;
assembling the plurality of feature vectors into a single vector; and
loading the single vector into the neural network to generate a file feature vector,
wherein the neural network is pre-trained to generate similar file feature vector for similar assembled feature vectors and dissimilar file feature vector for dissimilar assembled feature vectors; and
assembling the file feature vectors of the plurality of files into a file feature vector database.

8. The medium of claim 7, the operations further comprising:
converting each of the single vectors into a fixed-length single vector prior to loading the fixed-length single vector into the neural network.

9. The medium of claim 8, wherein the converting is performed by defining a plurality of bins, pooling the single vector into the plurality of bins, and concatenating the plurality of bins to generate the fixed-length single vector.

10. The medium of claim 7, further comprising, upon receiving a query file performing the operations:
chunking the query file into a plurality of chunks;
loading the plurality of chunks into the neural network and operating the neural network to generate a plurality of feature vectors, one feature vector for each of the plurality of chunks;
concatenating the plurality of feature vectors into a query vector; and
loading the query vector into the neural network and operating the neural network to search the file feature vector database for all file feature vectors within a specified distance from the query vector.

11. The medium of claim 10, wherein a distance between the query vector and a file feature vector equals a distance between the query file and a file corresponding to the file feature vector to within a predefined error.

12. The medium of claim 7, further comprising pre-training the neural network by the process comprising:
obtaining a plurality of training files;
for each training file from a plurality of training files performing:
chunking the training file into a plurality of chunks;
loading the plurality of chunks into a neural network and operating the neural network to generate a plurality of feature vectors, one feature vector for each of the plurality of chunks, wherein the neural network is pre-trained to generate similar feature vector for similar chunks and dissimilar vector for dissimilar chunks;
assembling the plurality of feature vectors into a training vector;
generating a modified vector by modifying the training vector;
selecting a negative vector determined to be dissimilar to the training vector;
loading the training vector, the modified vector and the negative vector into the neural network to generate a file feature vector for each of the training vector, the modified vector and the negative vector; and
adapting internal weights of the neural network to minimize a distance for the file feature vectors for the training vector and the modified vector, and maximize the distance for the file feature vectors for the training vector and the negative vector.

13. A data processing system, comprising:
a memory storing instructions; and
a processor coupled to the memory to execute instructions from the memory, the processor being configured to perform operations, the operations comprising:
for each file from a plurality of files:
chunking the file into a plurality of chunks;
loading the plurality of chunks into a neural network and operating the neural network to generate a plurality of feature vectors, one feature vector for each of the plurality of chunks, wherein the neural network is pre-trained to generate similar feature vector for similar chunks and dissimilar vector for dissimilar chunks;
assembling the plurality of feature vectors into a single vector; and
loading the single vector into the neural network to generate a file feature vector,
wherein the neural network is pre-trained to generate similar file feature vector for similar assembled feature vectors and dissimilar file feature vector for dissimilar assembled feature vectors; and
assembling the file feature vectors of the plurality of files into a file feature vector database.

14. The system of claim 13, the operations further comprising converting each of the single vectors into a fixed-length single vector prior to loading the fixed-length single vector into the neural network.

15. The system of claim 14, wherein the converting is performed by defining a plurality of bins, pooling the single vector into the plurality of bins, and concatenating the plurality of bins to generate the fixed-length single vector.

16. The system of claim 13, further comprising, upon receiving a query file performing the operations:
chunking the query file into a plurality of chunks;
loading the plurality of chunks into the neural network and operating the neural network to generate a plurality of feature vectors, one feature vector for each of the plurality of chunks;

concatenating the plurality of feature vectors into a query vector; and loading the query vector into the neural network and operating the neural network to search the file feature vector database for all file feature vectors within a specified distance from the query vector.

17. The system of claim 16, wherein a distance between the query vector and a file feature vector equals a distance between the query file and a file corresponding to the file feature vector to within a predefined error.

18. The system of claim 13, further comprising pre-training the neural network by the process comprising:

obtaining a plurality of training files;

for each training file from a plurality of training files performing:

chunking the training file into a plurality of chunks;

loading the plurality of chunks into a neural network and operating the neural network to generate a plurality of feature vectors, one feature vector for each of the plurality of chunks, wherein the neural network is pre-trained to generate similar feature vector for similar chunks and dissimilar vector for dissimilar chunks;

assembling the plurality of feature vectors into a training vector;

generating a modified vector by modifying the training vector;

selecting a negative vector determined to be dissimilar to the training vector;

loading the training vector, the modified vector and the negative vector into the neural network to generate a file feature vector for each of the training vector, the modified vector and the negative vector; and adapting internal weights of the neural network to minimize a distance for the file feature vectors for the training vector and the modified vector, and maximize the distance for the file feature vectors for the training vector and the negative vector.

19. A data processing system, comprising:

a backup database comprising a plurality of files;

a similarity index database comprising a plurality of similarity vectors, one similarity vector representing each of the files of the plurality of files, wherein each of the similarity vectors is generated from a concatenation of a plurality of chunk feature vectors, each of the chunk feature vectors representing a chunk of a file from the plurality of files; and a neural network pre-trained to receive a query file, generate a query vector, and provide an indication of all similarity vectors from the plurality of similarity vectors that are within a specified distance from the query vector.

20. The data processing system of claim 19, further comprising a chunk feature database storing the plurality of chunk feature vectors, and wherein the neural network is further pre-trained to receive a query chunk, generate a chunk query vector, and provide an indication of all similarity chunk vectors from the plurality of chunk feature vectors that are within a specified distance from the chunk query vector.

* * * * *